United States Patent
Bunch

(10) Patent No.: US 8,618,977 B2
(45) Date of Patent: Dec. 31, 2013

(54) WEATHER RADAR BEAM-SHARPENING AND DE-QUANTIZATION

(75) Inventor: Brian P. Bunch, Snohomish, WA (US)

(73) Assignee: Honeywell International Inc., Morristown, NJ (US)

( * ) Notice: Subject to any disclaimer, the term of this patent is extended or adjusted under 35 U.S.C. 154(b) by 341 days.

(21) Appl. No.: 13/051,769

(22) Filed: Mar. 18, 2011

(65) Prior Publication Data

US 2012/0169531 A1    Jul. 5, 2012

Related U.S. Application Data

(60) Provisional application No. 61/430,009, filed on Jan. 5, 2011.

(51) Int. Cl.
*G01S 13/00* (2006.01)

(52) U.S. Cl.
USPC ..... 342/26 B; 345/25 R; 345/25 A; 345/25 F; 345/26 R; 345/175

(58) Field of Classification Search
USPC ....... 342/25 R, 25 A, 25 B, 25 C, 25 D, 25 E, 342/25 F, 26 R, 26 A, 26 B, 26 C, 26 D
See application file for complete search history.

(56) References Cited

U.S. PATENT DOCUMENTS

| | | | | |
|---|---|---|---|---|
| 3,614,778 A | * | 10/1971 | Graham et al. | 342/25 A |
| 4,387,373 A | * | 6/1983 | Longuemare, Jr. | 342/25 C |
| 4,851,848 A | * | 7/1989 | Wehner | 342/25 D |
| 4,978,961 A | * | 12/1990 | Williams et al. | 342/25 C |
| 5,442,364 A | * | 8/1995 | Lee et al. | 342/372 |
| 5,469,167 A | * | 11/1995 | Polge et al. | 342/25 A |
| 5,502,447 A | * | 3/1996 | Kumpfbeck et al. | 342/373 |
| 5,831,570 A | * | 11/1998 | Ammar et al. | 342/26 B |
| 5,847,673 A | * | 12/1998 | DeBell | 342/25 C |
| 6,236,351 B1 | * | 5/2001 | Conner et al. | 342/26 B |
| 6,542,110 B1 | * | 4/2003 | Lohner et al. | 342/25 R |
| 6,591,171 B1 | * | 7/2003 | Ammar et al. | 701/16 |
| 7,106,250 B2 | | 9/2006 | Blunt et al. | |
| 7,109,912 B1 | * | 9/2006 | Paramore et al. | 342/26 B |
| 7,333,047 B2 | * | 2/2008 | Fullerton et al. | 342/28 |
| 7,372,394 B1 | * | 5/2008 | Woodell et al. | 342/26 R |
| 7,417,586 B2 | * | 8/2008 | Thomas et al. | 342/174 |
| 7,535,412 B1 | | 5/2009 | Blunt et al. | |
| 7,616,150 B1 | * | 11/2009 | Woodell | 342/120 |
| 2003/0139662 A1 | * | 7/2003 | Seidman | 600/407 |

(Continued)

OTHER PUBLICATIONS

Sadjadi et al., Radar synthetic vision system for adverse weather aircraft landing, IEEE Transactions on Aerospace and Electronic Systems vol. 35, No. 1, Jan. 1999, IEEE Log No. T-AES/.5/1/01485.

(Continued)

*Primary Examiner* — Jack W Keith
*Assistant Examiner* — Peter Bythrow
(74) *Attorney, Agent, or Firm* — Shumaker & Sieffert, P.A.

(57) ABSTRACT

Systems and methods for improving display quality for at range weather data of smaller antenna size radar weather systems. A processor receives a column of quantized reflectivity data associated with an antenna from a radar system. The processor adjusts the column of quantized reflectivity data based on estimated quantized reflectivity data associated with a beam pattern for an antenna that is larger than the antenna associated with the received column of quantized reflectivity data.

20 Claims, 6 Drawing Sheets

(56) References Cited

U.S. PATENT DOCUMENTS

| | | | | |
|---|---|---|---|---|
| 2004/0227658 A1* | 11/2004 | VandenBerg | ............... | 342/25 R |
| 2006/0152402 A1* | 7/2006 | Krikorian et al. | ........... | 342/25 A |
| 2007/0026900 A1* | 2/2007 | Smith | ........................ | 455/562.1 |
| 2008/0143585 A1* | 6/2008 | Thomas et al. | ............... | 342/174 |
| 2008/0297405 A1* | 12/2008 | Morrison et al. | ............ | 342/25 F |
| 2009/0051584 A1* | 2/2009 | Hellsten | ....................... | 342/25 A |
| 2009/0231185 A1* | 9/2009 | Hamalainen | ................ | 342/25 R |
| 2012/0056780 A1* | 3/2012 | Antonik et al. | ............. | 342/25 B |

OTHER PUBLICATIONS

Search Report from European patent application No. 12150213.2, dated May 4, 2012, 4 pp.

Examination Report from counterpart European patent application No. 12150213.2, dated Jun. 13, 2012, 5 pp.

Response to Examination Report dated Jun. 13, 2012, from counterpart European patent application No. 12150213.2, filed Oct. 1, 2012, 6 pp.

\* cited by examiner

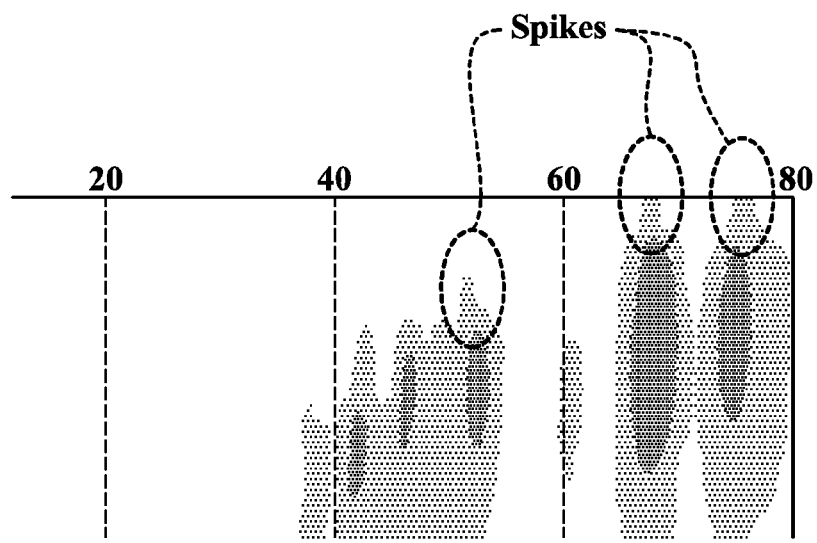
FIG. 1 *(Prior Art)*
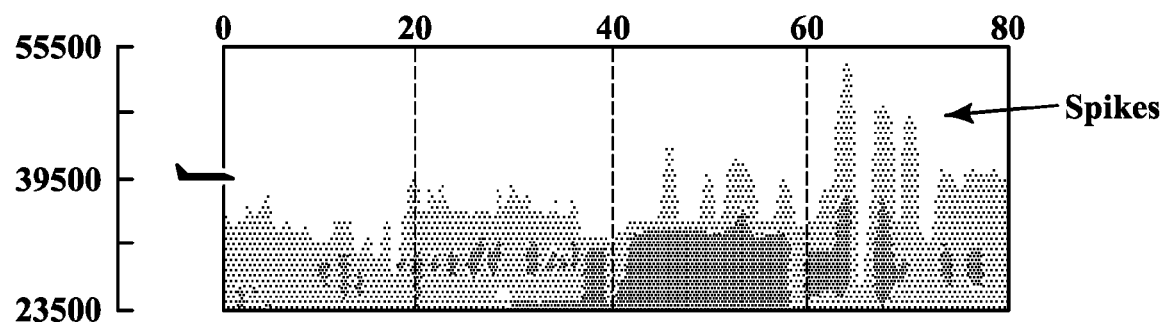
FIG. 2 *(Prior Art)*

WEATHER RADAR BEAM-SHARPENING AND DE-QUANTIZATION

PRIORITY CLAIM

This application claims the benefit of U.S. Provisional Application Ser. No. 61/430,009 filed Jan. 5, 2011, the contents of which are hereby incorporated by reference.

BACKGROUND OF THE INVENTION

Due to the maximum physical size constraints of airborne weather radar antennas, a desired narrow antenna beam is often not achieved, thus resulting in less-than-desired detail in displayed weather data. This is especially evident in vertical displays (relatively new to the industry) and is worse with smaller antennas (e.g., those used in business jets).

Well-known Doppler beam-sharpening techniques will not work well straight ahead of the aircraft or in the vertical direction. Also, the natural Doppler noise of weather might be another challenge.

Small aircraft can fit only small, wide-beam antennas, thus limiting their beam-sharpening abilities.

FIGS. 1 and 2 show some problems evident on a vertical display because of 15:1 expansion of vertical scale. The problems are as follows:

low resolution, due to antenna beam width;
blocky appearance, due to quantization of volumetric data; and
attempts to smooth output for display result in a tradeoff between smoothness and further resolution loss.

A straightforward approach of converting to frequency domain and multiplying by an inverse of the beam pattern (either real or a "softened" notional antenna) fails to work with real data because it involves dividing by very small numbers and thus the data became unstable.

SUMMARY OF THE INVENTION

A processor receives a column of quantized reflectivity data associated with an antenna from a radar system. The processor adjusts the column of quantized reflectivity data based on estimated quantized reflectivity data associated with a beam pattern for an antenna that is larger than the antenna associated with the received column of quantized reflectivity data.

The present invention makes use of a notional "desired antenna" to relax constraints (i.e., simulate a "larger antenna" with narrower beam). This enables the algorithm to converge quicker to an optimal solution, while reducing memory requirements. The present invention also makes use of a smooth (e.g., Gaussian) perturbing function matched to desired antenna response. This provides an optimally smooth output, helps the algorithm converge quicker, reduces memory requirements, and addresses quantization without smearing the output.

BRIEF DESCRIPTION OF THE DRAWINGS

Preferred and alternative embodiments of the present invention are described in detail below with reference to the following drawings:

FIGS. 1 and 2 show results produced by a prior-art airborne weather radar antenna;

DETAILED DESCRIPTION OF THE INVENTION

Figure 3:
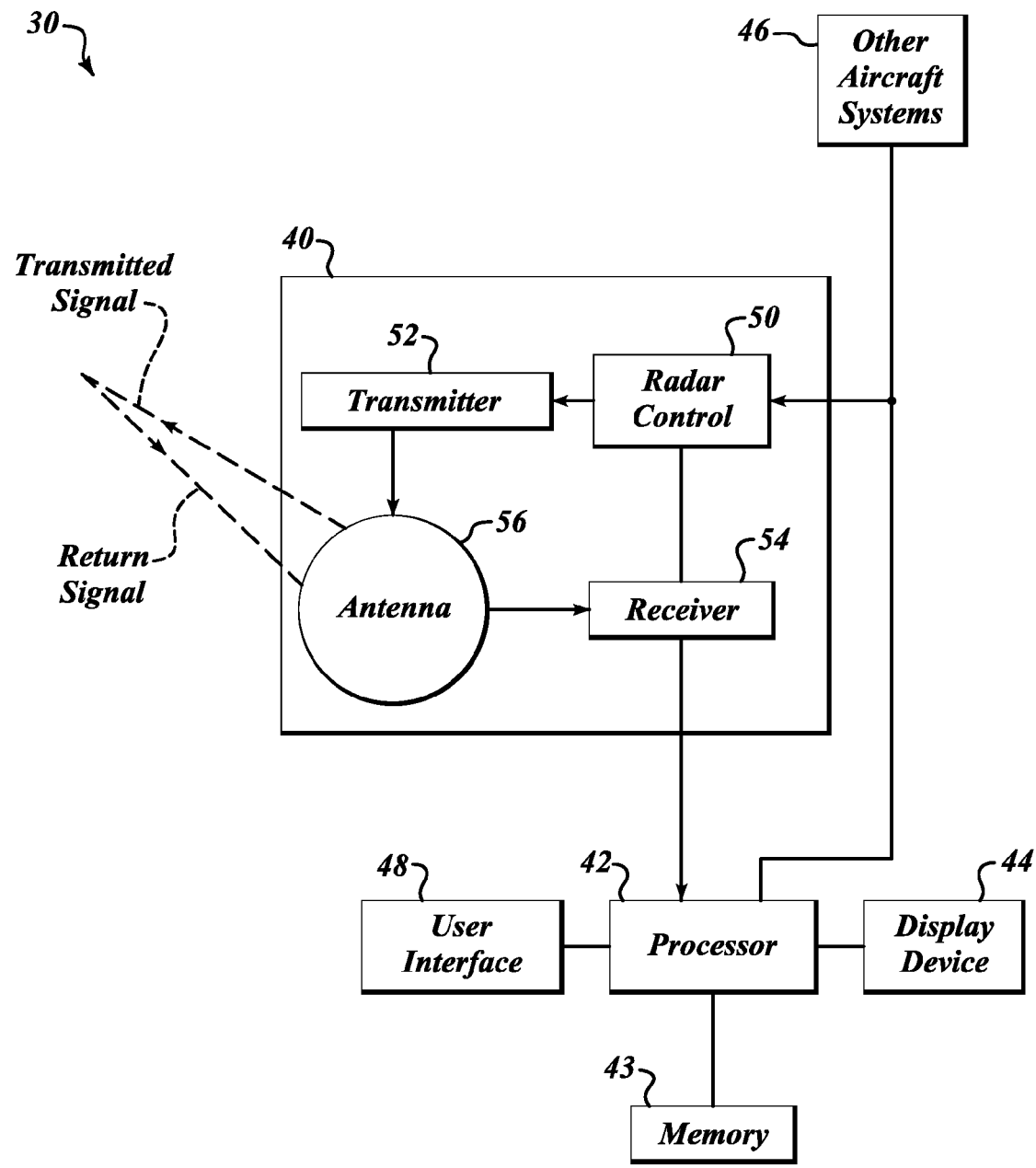
FIG. 3 shows an exemplary system formed in accordance with the present invention.

The present invention is a system, method, and computer program product for improving detail of a weather radar display at range. FIG. 3 illustrates an exemplary system 30 formed in accordance with the present invention. The system 30 includes a weather radar system 40, a processor 42, memory 43, a display device 44, other aircraft systems 46, and a user interface 48. The processor 42 is electrically coupled to the weather radar system 40, the display device 44, the other systems 46, the user interface 48, and the memory 43. An exemplary weather radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from one or more of the other aircraft systems 46.

The weather radar system 40 receives signals that arise from the scattering of transmitted pulses from the external environment, including primarily weather and terrain. The received signals are passed to the processor 42, which uses the received signals to update estimates of weather reflectivity contained in the memory 43 (i.e., volumetric (3-D) buffer). The processor 42 generates an image for presentation on the display device 44, based on any control signals sent from the user interface 48 or based on settings within the processor 42.

Figure 4:
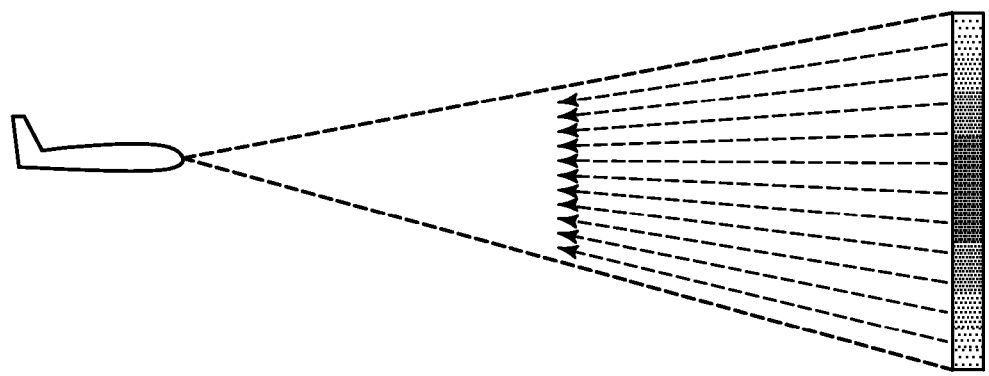
FIG. 4 shows a vertical column of ideal data from a volumetric buffer.
Figure 5:
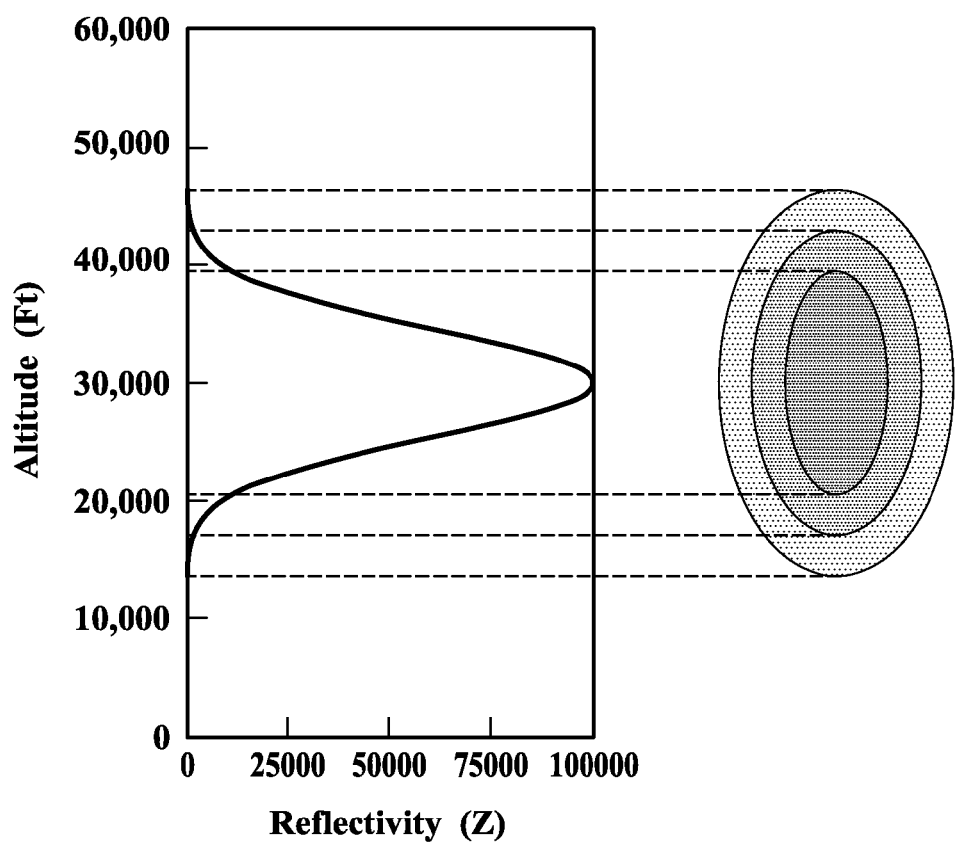
FIG. 5 shows reflectivity values for the data shown in FIG. 4.

The present invention focuses on one-dimensional vertical columns of reflectivity out of a volumetric weather buffer and an optimum curve associated with that column of data; see FIGS. 4 and 5.

Figure 6:
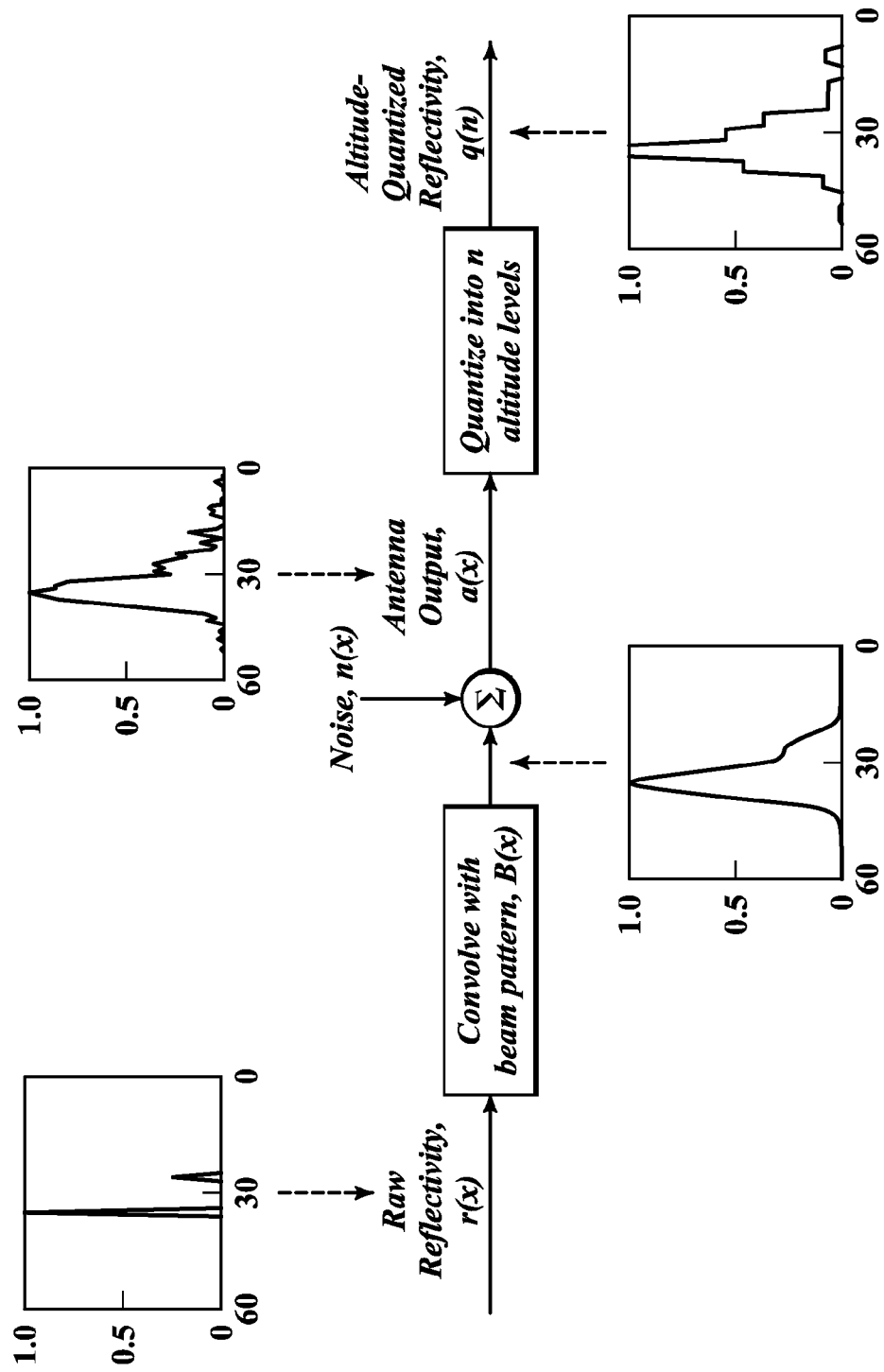
FIG. 6 illustrates a model of the prior-art system.

FIG. 6 shows a model of the prior art system. Optimal output of volumetric buffer is "raw" reflectivity data (beam function r(x)) that is a function of altitude. The raw reflectivity data r(x) is convolved with a beam pattern function B(x). Then noise is added to create a(x). The a(x) signal is quantized to produce an altitude-quantized reflectivity, q(n). The altitude-quantized reflectivity signal q(n) is measurable and is what gets stored into the 3-D buffer in the memory 43.

Figure 7:
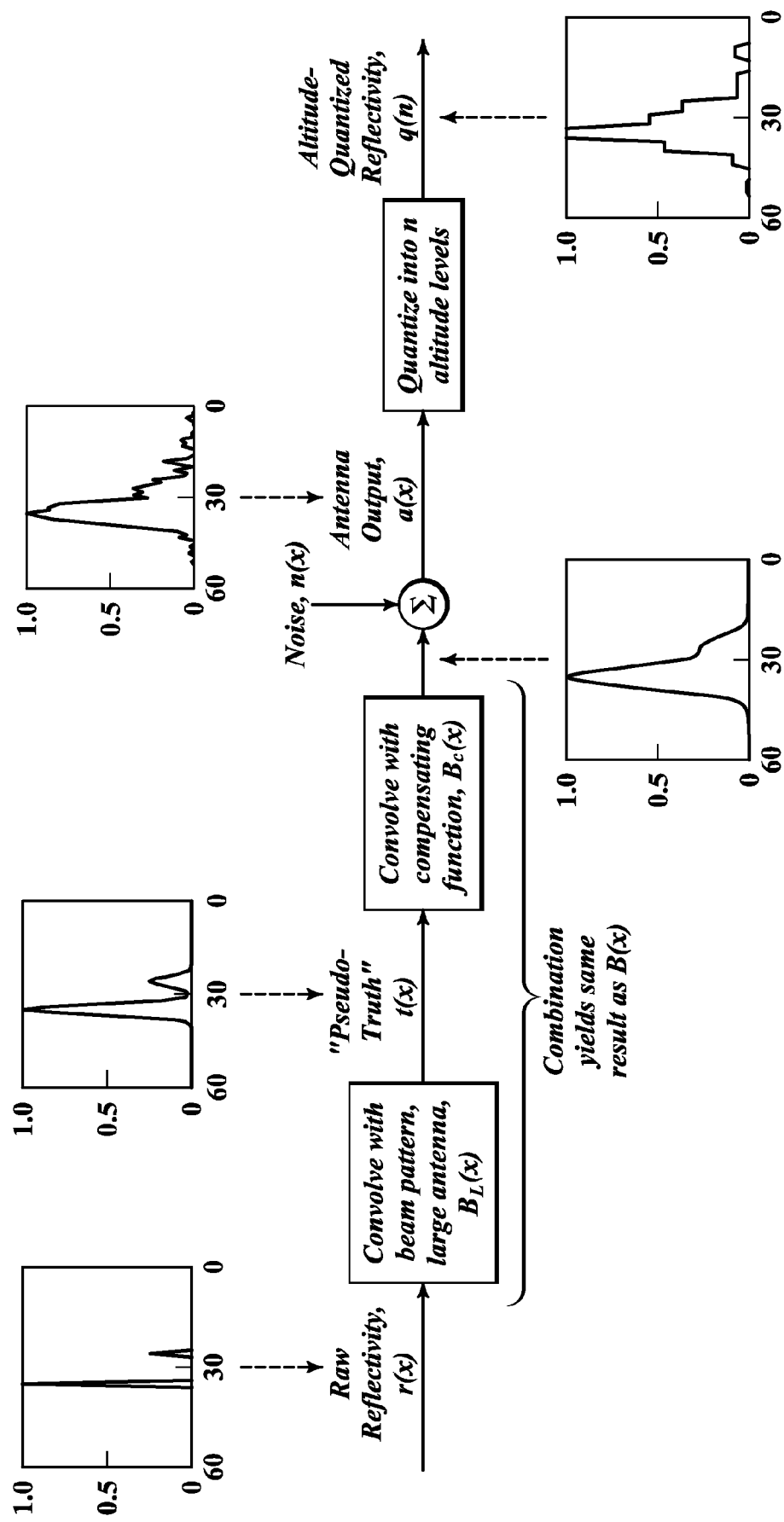
FIG. 7 illustrates a model of a system formed in accordance with the present invention.

FIG. 7 illustrates a beam-sharpening model conceived by the present invention. The beam function B(x) of the actual antenna is split into two parts $B_L(x)$, $B_c(x)$, such that:

convolution of the two parts is equal to original beam function B(x); and the first part is equivalent to the desired amount of beam sharpening (e.g., "60-inch" antenna).

A pseudo-truth signal t(x) is determined by convolving the "real-truth" raw reflectivity data (optimal) r(x) with a beam-shape weighting function $B_L(x)$ corresponding to an antenna with half the beamwidth (or equivalently, twice the diameter). Weighting functions corresponding to other sized antenna may be used. $B_L(x)$ is the beamwidth function of a notional "larger" antenna with a smaller (but not infinitely small) beamwidth. When the "raw" reflectivity is convolved with $B_L(x)$ a "smoother" (less detailed) function is produced. A sharpening process (FIG. 8) tries to converge on this convolved function t(x). This allows for faster convergence. r(x) is based on theoretical reflectivity data.

Then the model of FIG. 7 performs the same as the model of FIG. 6. $B_c(x)$ is a "compensating" beamwidth function, which takes the data out of the "larger" (e.g., 60-inch) antenna and upon convolving provides an even "less detailed" function, which is theoretically identical to what would be achieved with the smaller "real" (e.g., 30-inch) antenna.

Figure 8:
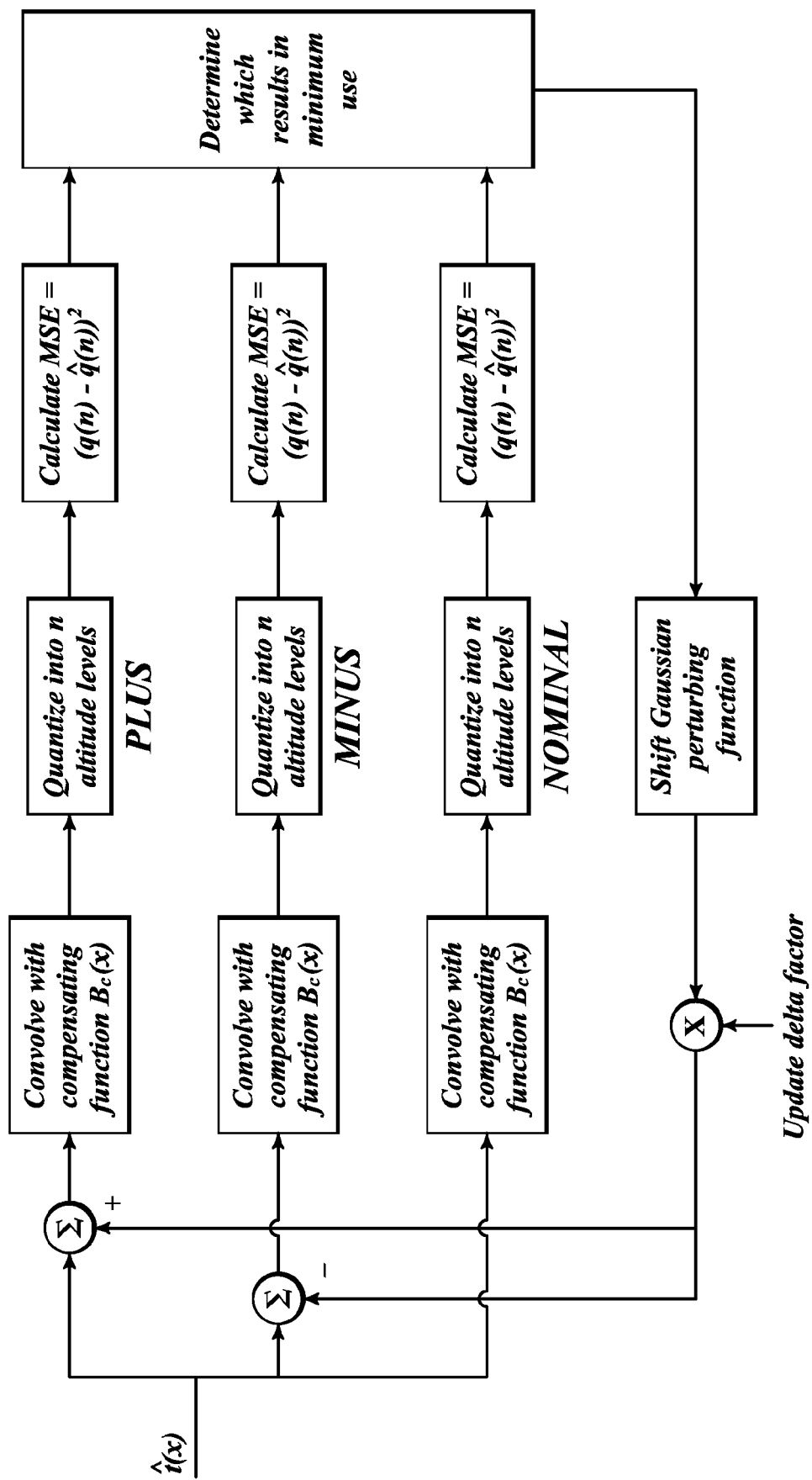
FIG. 8 illustrates a flowchart of an exemplary process formed in accordance with the present invention.

As shown in FIG. 8, an iterative mean square error (MSE) technique is used to minimize MSE between a model output and the actual quantized data in the volumetric buffer. Successive "guesses" $\hat{t}(x)$ are made for t(x) as shown in FIG. 7. $\hat{t}(x)$ is convolved three different ways with $B_c(x)$:

Example of B(x) functions in general:

$$Ba(x) = e^{-k(x/\theta_a)^2}$$

where $k = 4 \ln \sqrt{2}$
$\theta_a$ = Beamwidth
$\theta_{30}$ = 3 degrees
$\theta_{60} = \theta_L$ = 1.5 degrees
$\theta_C$ = 2.6 degrees
first with an added shifted perturbing function;
second with a subtracted shifted perturbing function; and
third without any shifted perturbing function.

Each convolution is quantized into N altitude levels to get $\hat{q}(n)$. N is selected based on a design decision trading off number of voxels (memory locations) against "smoothness." For RDR-4000 produced by Honeywell Inc. N is determined as a function of range and fits N altitude levels into a range from 0 to 60,000 ft, for example:

20 NM Buffer: N=32
40 NM Buffer: N=16
80 NM Buffer: N=8
160 NM Buffer: N=4
320 NM Buffer: N=2.

Then the MSE of each of the quantized results $\hat{q}(n)$ and the reflectivity signal q(n) is determined. A Gaussian perturbing function is shifted, based on which of the guesses $\hat{q}(n)$ has the lowest MSE. The shifted Gaussian function is combined with a delta factor. This combination adjusts the value added to or subtracted from $\hat{t}(x)$ for the next iteration. After a predetermined number of iterations or a "goal" MSE has been attained, the process is complete.

An empirical calculus-of-variations approach is taken, summarized as:
perturb latest guess of t(x); and
if MSE is decreased, keep perturbed function otherwise revert to previous low MSE.

A smooth perturbation function is used that matches a desired beam shape of the reflectivity data (see FIG. 5), i.e., Gaussian. The Gaussian function is shifted along an independent variable on successive guesses.

Although the estimate $\hat{t}(x)$ does not completely match the ideal r(x), the estimate $\hat{t}(x)$ is certainly closer to the truth than the quantized or nonquantized version's result. Comparable optimizations may be used.

The present invention also provides an optimally smooth output without the further "spreading" from moving-, averaging-, or interpolation-type smoothing.

After the process of FIG. 8 is determined complete, q(n) is altered (stored in the 3D buffer) based on the $\hat{q}(n)$ with the lowest MSE. When the image is generated for the vertical profile view display from the new q(n) data, the image will be comparable to a image produced from a larger antenna. Thus, a system with a 30-inch antenna acts closer to that of a 60-inch antenna when t(x) is associated with a larger 60-inch antenna.

In one embodiment, the iterative process shown in FIG. 8 is performed only on q(n) data beyond a predefined distance. This predefined distance may be based on the size of the antenna. For example, if the system includes a 30-inch antenna, then the iterative process is performed only on data beyond 40 nm. However, if the system includes a 20-inch antenna, then the iterative process is performed on data beyond a closer in range.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   receiving, by a processor, a vertical column of quantized reflectivity data sampled by an antenna; and
   adjusting, by the processor, the vertical column of quantized reflectivity data based on estimated raw reflectivity data associated with a beam pattern for an antenna that has a smaller beamwidth than the antenna associated with the received vertical column of quantized reflectivity data, wherein adjusting the vertical column of quantized reflectivity data comprises iteratively modifying the estimated raw reflectively data to reduce a mean-square-error between the estimated raw reflectivity data and the quantized reflectivity data.

2. The method of claim 1, wherein iteratively modifying the estimated raw reflectively data comprises:
   a) providing an estimated large antenna reflectivity signal based on a convolution of an estimated optimum raw reflectivity signal with a first beamwidth function associated with the larger antenna, the estimated large antenna raw reflectivity signal being a first value;
   b) creating a second value by adding a predefined adjustment value to the estimated large antenna raw reflectivity signal;
   c) creating a third value by subtracting a predefined adjustment value from the estimated large antenna raw reflectivity signal;
   d) convolving the first through third values with a second beamwidth function associated with the smaller antenna;
   e) generating first, second and third quantized estimated reflectivity values by quantizing the results of the convolution of the first through third values into a previously defined number of altitude levels;
   f) comparing the first, second and third quantized estimated reflectivity values with the received quantized reflectivity value;
   g) determining, based on the comparisons, which of the first, second and third quantized estimated reflectivity values is closest to the received quantized reflectivity value;
   h) adjusting the first, second and third values based on the determined results;
   i) repeating d)-h) until an optimum result is attained; and
   j) storing the closest quantized estimated reflectivity value in a three-dimensional memory.

3. The method of claim 2, wherein comparing comprises calculating a mean square error (MSE) between each of the first, second and third quantized estimated reflectivity values and the received quantized reflectivity value.

4. The method of claim 3, wherein determining comprises determining which of the MSE calculations results in the lowest MSE value.

5. The method of claim 4, wherein the optimum result comprises an MSE result below a predefined level.

6. The method of claim 4, wherein the optimum result comprises a predefined number of repetitions of d)-h).

7. The method of claim 1, wherein adjusting comprises adjusting only on quantized reflectivity data beyond a predefined range.

8. A system comprising:
a radar system configured to produce a vertical column of quantized reflectivity data sampled by an antenna;
a memory comprising a three-dimensional buffer; and
a processor in signal communication with the radar system and the memory, the processor being configured to adjust the vertical column of quantized reflectivity data based on estimated raw reflectivity data associated with a beam pattern for an antenna that has a smaller beamwidth than the antenna associated with the received vertical column of quantized reflectivity data, wherein the processor is configured to adjust the vertical column of quantized reflectivity data by at least iteratively modifying the estimated raw reflectively data to reduce a mean-square-error between the estimated raw reflectivity data and the quantized reflectivity data.

9. The system of claim 8, wherein the processor is configured to iteratively modify the estimated raw reflectivity data by at least:
a) providing an estimated large antenna raw reflectivity signal based on a convolution of an estimated optimum raw reflectivity signal with a first beamwidth function associated with the larger antenna, the estimated large antenna raw reflectivity signal being a first value;
b) creating a second value by adding a predefined adjustment value to the estimated large antenna raw reflectivity signal;
c) creating a third value by subtracting a predefined adjustment value from the estimated large antenna raw reflectivity signal;
d) convolving the first through third values with a second beamwidth function associated with the smaller antenna;
e) generating first, second and third quantized estimated reflectivity values by quantizing the results of the convolution of the first through third values into a previously defined number of altitude levels;
f) comparing the first, second and third quantized estimated reflectivity values with the received quantized reflectivity value;
g) determining, based on the comparisons, which of the first, second and third quantized estimated reflectivity values is closest to the received quantized reflectivity value;
h) adjusting the first, second and third values based on the determined results;
i) repeating d)-h) until an optimum result is attained; and
j) storing the closest quantized estimated reflectivity value in the memory.

10. The system of claim 9, wherein the processor is configured to compare by at least calculating a mean square error (MSE) between each of the first, second and third quantized estimated reflectivity values and the received quantized reflectivity value.

11. The system of claim 10, wherein the processor is configured to determine by at least determining which of the MSE calculations results in the lowest MSE value.

12. The system of claim 11, wherein the optimum result comprises an MSE result below a predefined level.

13. The system of claim 11, wherein the optimum result comprises a predefined number of repetitions of d)-h).

14. The system of claim 8, wherein the processor is configured to adjust by at least adjusting only on quantized reflectivity data beyond a predefined range.

15. A system comprising:
a radar system configured to produce a vertical column of quantized reflectivity data sampled by an antenna; and
a processor in signal communication with the radar system and the memory, wherein the processor is configured to adjust the vertical column of quantized reflectivity data based on estimated reflectivity data associated with a beam pattern for an antenna that is larger than the antenna associated with the received vertical column of quantized reflectivity data, wherein the processor is configured to adjust the vertical column of quantized reflectivity data by at least:
a) providing an estimated large antenna raw reflectivity signal based on a convolution of an estimated optimum raw reflectivity signal with a first beamwidth function associated with the larger antenna, the estimated large antenna raw reflectivity signal being a first value;
b) creating a second value by adding a predefined adjustment value to the estimated large antenna raw reflectivity signal;
c) creating a third value by subtracting a predefined adjustment value from the estimated large antenna raw reflectivity signal;
d) convolving the first through third values with a second beamwidth function associated with the smaller antenna;
e) generating first, second and third quantized estimated reflectivity values by quantizing the results of the convolution of the first through third values into a previously defined number of altitude levels;
f) comparing the first, second and third quantized estimated reflectivity values with the received quantized reflectivity value;
g) determining, based on the comparisons, which of the first, second and third quantized estimated reflectivity values is closest to the received quantized reflectivity value; and
h) adjusting the first, second and third values based on the determined results.

16. The system of claim 15, further comprising a memory, wherein the processor is further configured to:
i) repeat d)-h) until an optimum result is attained; and
j) store the closest quantized estimated reflectivity value in the memory.

17. The system of claim 15, wherein the processor is configured to determine by at least determining which of the MSE calculations results in the lowest MSE value.

18. The system of claim 17, wherein the optimum result comprises an MSE result below a predefined level.

19. The system of claim 16, wherein the optimum result comprises a predefined number of repetitions of d)-h).

20. The system of claim 15, wherein the processor is configured to adjust by at least adjusting only on quantized reflectivity data beyond a predefined range.

* * * * *